(12) United States Patent
Brackman (10) Patent No.: US 10,399,505 B1
(45) Date of Patent: Sep. 3, 2019

(54) COLLAPSABLE PICKUP TRUCK STORAGE COMPARTMENT

(71) Applicant: Jeremy H. Brackman, Toledo, OH (US)

(72) Inventor: Jeremy H. Brackman, Toledo, OH (US)

( * ) Notice: Subject to any disclaimer, the term of this patent is extended or adjusted under 35 U.S.C. 154(b) by 185 days.

(21) Appl. No.: 15/216,246

(22) Filed: Jul. 21, 2016

Related U.S. Application Data (60) Provisional application No. 62/197,993, filed on Jul. 28, 2015.

(51) Int. Cl.
*B60R 9/06* (2006.01)

(52) U.S. Cl.
CPC .................... *B60R 9/065* (2013.01)

(58) Field of Classification Search
CPC .............. B60R 5/04; B60R 9/00; B60R 7/00
USPC ........................ 224/404, 403, 497
See application file for complete search history.

(56) References Cited

U.S. PATENT DOCUMENTS

| | | | | |
|---|---|---|---|---|
| 806,448 A * | 12/1905 | Allison | ..................... | B65D 9/14 217/14 |
| 1,673,769 A * | 6/1928 | Graham | ................. | G07C 13/02 220/6 |
| 1,822,585 A * | 9/1931 | Douglas | ................... | B65D 9/14 217/14 |
| 1,972,483 A * | 9/1934 | Hartson | ................... | B65D 7/26 220/6 |
| 2,953,244 A * | 9/1960 | Phillips | ..................... | A47F 5/10 108/63 |
| 3,746,203 A * | 7/1973 | Cipolla | .................... | B65D 7/26 217/14 |
| 3,814,220 A * | 6/1974 | Brody | .................. | A45C 7/0036 190/19 |
| 3,982,650 A * | 9/1976 | Ichihara | ............ | B65D 11/1833 220/4.28 |
| 4,099,640 A * | 7/1978 | Nessfield | ............. | B65D 88/522 206/512 |
| 4,750,773 A * | 6/1988 | Chapline | ................. | B60R 11/06 296/37.5 |
| 4,765,480 A * | 8/1988 | Malmanger | .......... | B65D 21/064 206/506 |
| 4,828,312 A | 5/1989 | Kinkel et al. | | |
| 5,186,510 A * | 2/1993 | Stapp | ........................ | B60R 9/00 190/107 |
| 5,299,704 A * | 4/1994 | Thorby | .................... | B65D 7/26 220/6 |
| 5,526,972 A * | 6/1996 | Frazier | ...................... | B60R 7/02 220/529 |
| 5,829,655 A * | 11/1998 | Salopek | .................... | B60R 7/02 224/402 |
| 5,853,116 A * | 12/1998 | Schreiner | .................. | B60R 9/00 224/404 |
| 5,862,931 A * | 1/1999 | Cox | ................... | B65D 11/1893 206/508 |

(Continued)

*Primary Examiner* — Brian D Nash
(74) *Attorney, Agent, or Firm* — H. John Rizvi; The Patent Professor (57) ABSTRACT

Disclosed is a collapsible pickup truck storage compartment that can be selectively collapsed from an uncollapsed configuration to a collapsed configuration. The storage compartment includes a lid that can be selectively locked to cover the storage compartment when the storage compartment is either in the uncollapsed configuration or the collapsed configuration.

12 Claims, 10 Drawing Sheets

(56) References Cited

U.S. PATENT DOCUMENTS

| | | | | |
|---|---|---|---|---|
| 6,056,177 | A * | 5/2000 | Schneider | B60R 5/04 220/4.28 |
| 6,170,689 | B1 * | 1/2001 | Flesher | B65D 19/06 206/508 |
| 6,220,473 | B1 * | 4/2001 | Lehman | B65D 81/3858 150/901 |
| 6,257,640 | B1 * | 7/2001 | Leitner | B60R 9/00 224/404 |
| 6,401,995 | B1 | 6/2002 | Yuille et al. | |
| 6,454,148 | B1 | 9/2002 | Cook | |
| 6,507,701 | B2 * | 1/2003 | Lake | B60R 9/00 296/26.11 |
| 6,533,122 | B1 * | 3/2003 | Plunkett | B65D 19/12 206/600 |
| 6,536,826 | B1 * | 3/2003 | Reed | B60P 3/42 224/404 |
| 6,540,134 | B1 * | 4/2003 | Rasche | A47G 29/14 220/4.28 |
| 6,644,710 | B2 * | 11/2003 | Seel | B60R 7/02 224/497 |
| 6,644,711 | B2 | 11/2003 | Leitner et al. | |
| 6,676,182 | B2 * | 1/2004 | Fitts | B60P 3/40 224/403 |
| 7,036,861 | B2 * | 5/2006 | Steffens | B60R 7/08 224/404 |
| 7,234,618 | B2 | 6/2007 | Warganich | |
| 8,167,387 | B1 * | 5/2012 | Quinn | A47B 43/00 312/258 |
| D722,009 | S * | 2/2015 | Roach | D12/414.1 |
| 9,132,785 | B2 * | 9/2015 | Roach | B60R 9/065 |
| 9,132,786 | B2 * | 9/2015 | Roach | B60P 7/0892 |
| 9,387,812 | B2 * | 7/2016 | Bexar | B60R 9/06 |
| 2002/0053583 | A1 | 5/2002 | Aldrich | |
| 2002/0162869 | A1 | 11/2002 | Blair | |
| 2002/0179600 | A1 * | 12/2002 | King | B60R 9/00 220/6 |
| 2005/0242138 | A1 * | 11/2005 | Warganich | B60R 7/02 224/404 |
| 2006/0266778 | A1 | 11/2006 | Allotey | |
| 2010/0264180 | A1 | 10/2010 | Allotey | |
| 2014/0326764 | A1 | 11/2014 | Roach et al. | |
| 2016/0167718 | A1 * | 6/2016 | Wilson | B62D 33/02 224/404 |

* cited by examiner

COLLAPSABLE PICKUP TRUCK STORAGE COMPARTMENT

CROSS-REFERENCE TO RELATED APPLICATION

This application claims the benefit of U.S. Provisional Patent Application Ser. No. 62/197,993, filed Jul. 28, 2015, which is incorporated herein in its entirety.

FIELD OF THE INVENTION

The present invention relates generally to storage devices and more particularly to a collapsible storage compartment for a pickup truck bed.

BACKGROUND OF THE INVENTION

A pickup truck is a vehicle that has a bed that can be used for transporting various large-volume items, such as furniture, building materials, jet skis, etc. A pickup truck owner may desire to store various smaller items in a pickup truck, or desire to lockably secure items to prevent theft. For example, a pickup truck owner may desire to store a multitude of handheld tools, work boots, or helmets. However, a pickup truck owner may want to avoid storing such items inside a cabin of a pickup truck to avoid dirtying the insides of the cabin, or the pickup truck owner may feel that opening and closing cabin doors may be a nuisance for storing or extracting items. As such, a pickup truck owner may want to store items in the bed of a pickup truck, without having to interact with the cabin. But, standard pickup truck beds do not have a suitable compartment for conveniently storing and securing smaller items, and items stored in a pickup truck bed may shift or slide around the bed and cause damage.

Pickup truck storage boxes have been developed that allow for compartmentalized storage in a truck bed. Common truck storage boxes usually have an access panel that allows a user to access or store items in the pickup truck storage box. However, common pickup truck storage boxes take up a valuable volume in pickup truck beds. When common pickup truck storage boxes are not being used, they considerably reduce functionality of pickup truck beds. As such, there exists a need for a pickup truck storage box that saves space when not in use.

SUMMARY OF THE INVENTION

This summary is provided to introduce a selection of concepts in a simplified form that are further described below in the detailed description. This summary is not intended to identify key features of essential features of the claimed subject matter, nor is it intended to be used to limit the scope of the claimed subject matter. Furthermore, the claimed subject matter is not limited to implementations that solve any or all disadvantages noted in any part of this disclosure.

According to embodiments of the present disclosure, a collapsible pickup truck bed storage compartment is disclosed. The storage compartment is selectively collapsible between a collapsed and an uncollapsed configuration, and includes a collapsing mechanism to collapse the compartment, a lid configured to cover the compartment in the collapsed and uncollapsed configuration, and a locking mechanism to selectively lock the lid in the collapsed and uncollapsed configuration.

In another aspect, the lid includes retainers to retain panels of the lid in a flat configuration.

In another aspect, the storage compartment includes supports to support the storage compartment on sides of a truck bed.

In another aspect, the storage compartment includes sides that are slidably attached to tracks that are disposed inside the supports.

In another aspect, the storage compartment is slidably engagable with an existing truck bed rail system to slidably support the storage compartment.

In another aspect, storage compartment includes a plurality of panels that are hingably attached to facilitate collapsing of the storage compartment.

In another aspect, the panels of the storage compartment are substantially parallel to one another when the storage compartment is in the collapsed configuration.

Disclosed is a collapsible pickup truck bed storage compartment selectively collapsible between a collapsed and an uncollapsed configuration, comprising, a collapsing mechanism to collapse the compartment, a lid configured to cover the compartment in the collapsed and uncollapsed configuration, and a locking mechanism to selectively lock the lid in the collapsed and uncollapsed configuration.

In another aspect, the collapsing mechanism includes one or more hinges.

In another aspect, the storage compartment further comprises a bottom configured to fold inward toward an internal space of the storage compartment, the bottom including one or more bottom panels that are hingably attached to one another via the one or more hinges.

In another aspect, the storage compartment further comprises a left side and a right side each configured to fold inward toward an internal space of the storage compartment and each including one or more respective panels that are hingably attached to one another via the one or more hinges.

In another aspect, the left side and the right side are attached to the storage compartment via respective tracks, the left and right sides being slidable along the respective tracks to collapse the left and right sides.

In another aspect, the respective tracks are disposed on respective supports at opposite ends of the storage compartment, the respective supports configured for mounting on a vehicle bed.

In another aspect, the storage compartment further comprises a front panel and a back panel that define the internal space of the storage compartment, the front panel being slidable relative to the back panel along the respective tracks to variably reduce or expand the internal space, wherein sliding motion of the front panel toward the back panel causes folding of the left and right sides.

In another aspect, the storage compartment further comprises a front panel and a back panel that define the internal space of the storage compartment, the front panel being slidable relative to the back panel to variably reduce or expand the internal space.

In another aspect, the storage compartment further comprises a back panel, wherein the lid is hingably attached to the back panel via the one or more hinges for selectively covering an internal space of the storage compartment.

In another aspect, the storage compartment further comprises one or more retainers configured to retain the lid in a flat configuration substantially perpendicular to the back panel.

In another aspect, the lid includes a first panel and a second panel, and in the flat configuration the first panel and the second panel are substantially coplanar.

In another aspect, the storage compartment further comprises a front panel, the lid being operable to fold downward and over the front panel.

In another aspect, the storage compartment further comprises, a front panel, a bottom, a left side, and a right side, wherein, in the collapsed configuration, the lid, the front panel, the bottom, the left side, and the right side are substantially parallel to one another.

In another aspect, the storage compartment further comprises, a front panel, and a back panel, wherein the locking mechanism includes one or more pins disposed on the front panel that engage one or more receiving buckles disposed on the lid.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the claimed subject matter will hereinafter be described in conjunction with the appended drawings provided to illustrate and not to limit the scope of the claimed subject matter, where like designations denote like elements, and in which:

It is to be understood that like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 5:
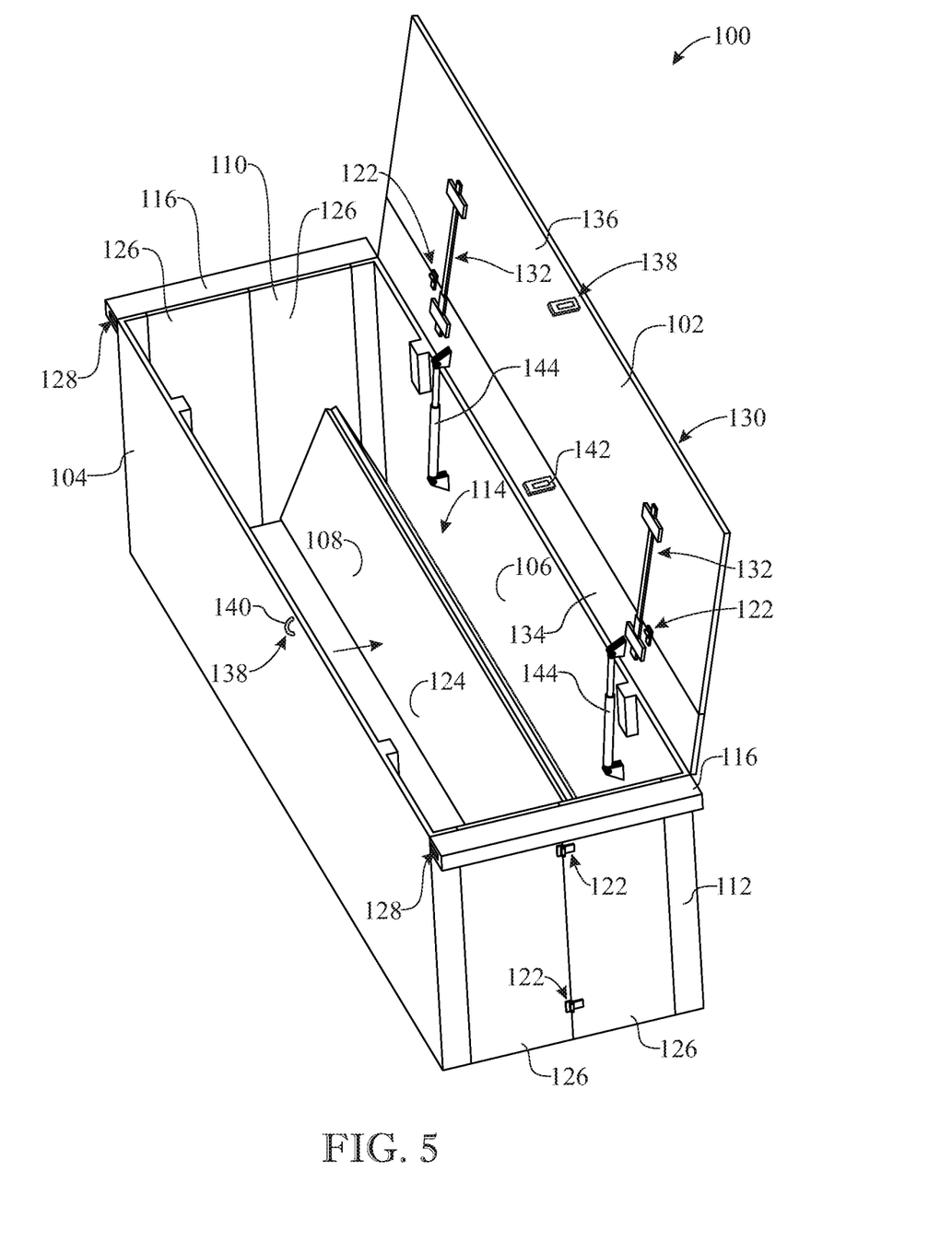
FIG. 5 presents a perspective view of a first exemplary collapsing step of the truck storage compartment, in accordance with aspects of the present disclosure.

The illustration of FIG. 5 presents an exemplary storage compartment 100 including a lid 102, a front panel 104, a back panel 106, a bottom 108, a left side 110, and a right side 112. The lid 102, front panel 104, back panel 106, bottom 108, left side 110, right side 112 or a combination thereof may include any appropriate rigid or semi-rigid material, such as plastic, wood, or metal. It is preferred that the materials included to structure the elements of storage compartment 100 are able to sustain storage of heavy tools and items without breaking. For example, the materials used in the structural elements of the storage compartment 100 described above may be chosen to sustain structural integrity while heavy items shift, slam or hit the sides of the storage compartment 100 while the storage compartment 100 is being transported.

The illustration of FIG. 5 shows the elements of the storage compartment 100 defining or forming an internal space 114. It is to be understood that one or more elements of the storage compartment 100 and/or any combination thereof may define or form internal space 114 when the storage compartment is installed in a pickup truck bed, such as bed 200 shown in FIG. 1. For example, in one embodiment the back panel 106 and the front panel 104 form internal space 114 inside the bed 200 of a pickup truck without requiring the left side 110, right side 112 or bottom 108.

Figure 1:
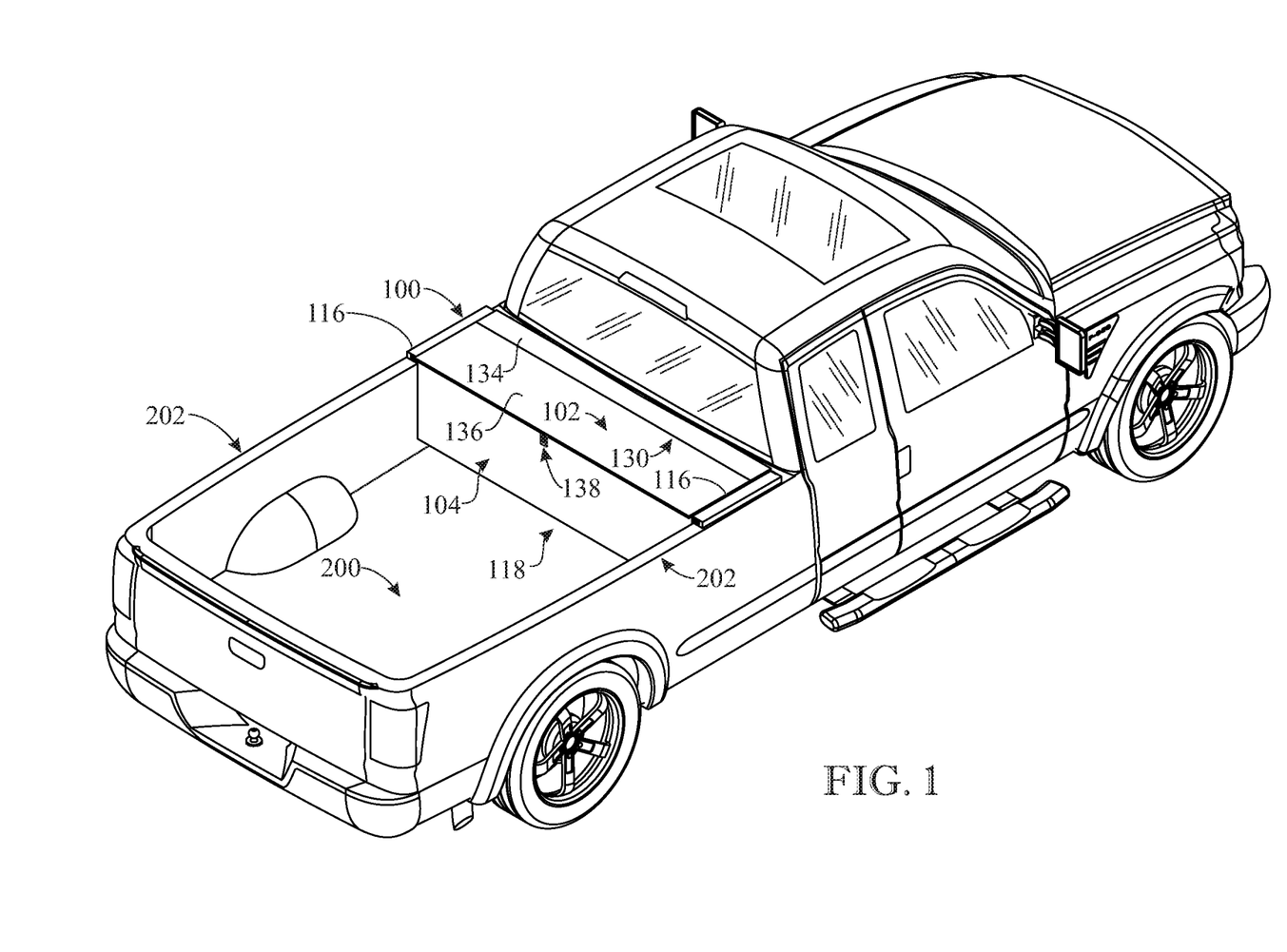
FIG. 1 presents an isometric front top view of a truck storage compartment installed in a bed of a pickup truck in, accordance with aspects of the present disclosure.

The storage compartment 100 may be installed or attached to the bed 200 in any appropriate way without departing from scope of this disclosure. For example, the storage compartment 100 may include supports 116 that are configured to rest (e.g., via suitable detachable or fixed mountings) on side walls 202 of the bed 200 as shown in FIG. 1 to support the storage compartment in the bed 200. The supports 116 can be constructed as end flanges protruding from opposite ends of the storage compartment 100, as shown in the drawings. The supports 116 may each have a longitudinal length substantially the same as the distance between the back panel 106 and the front panel 104.

Figure 6:
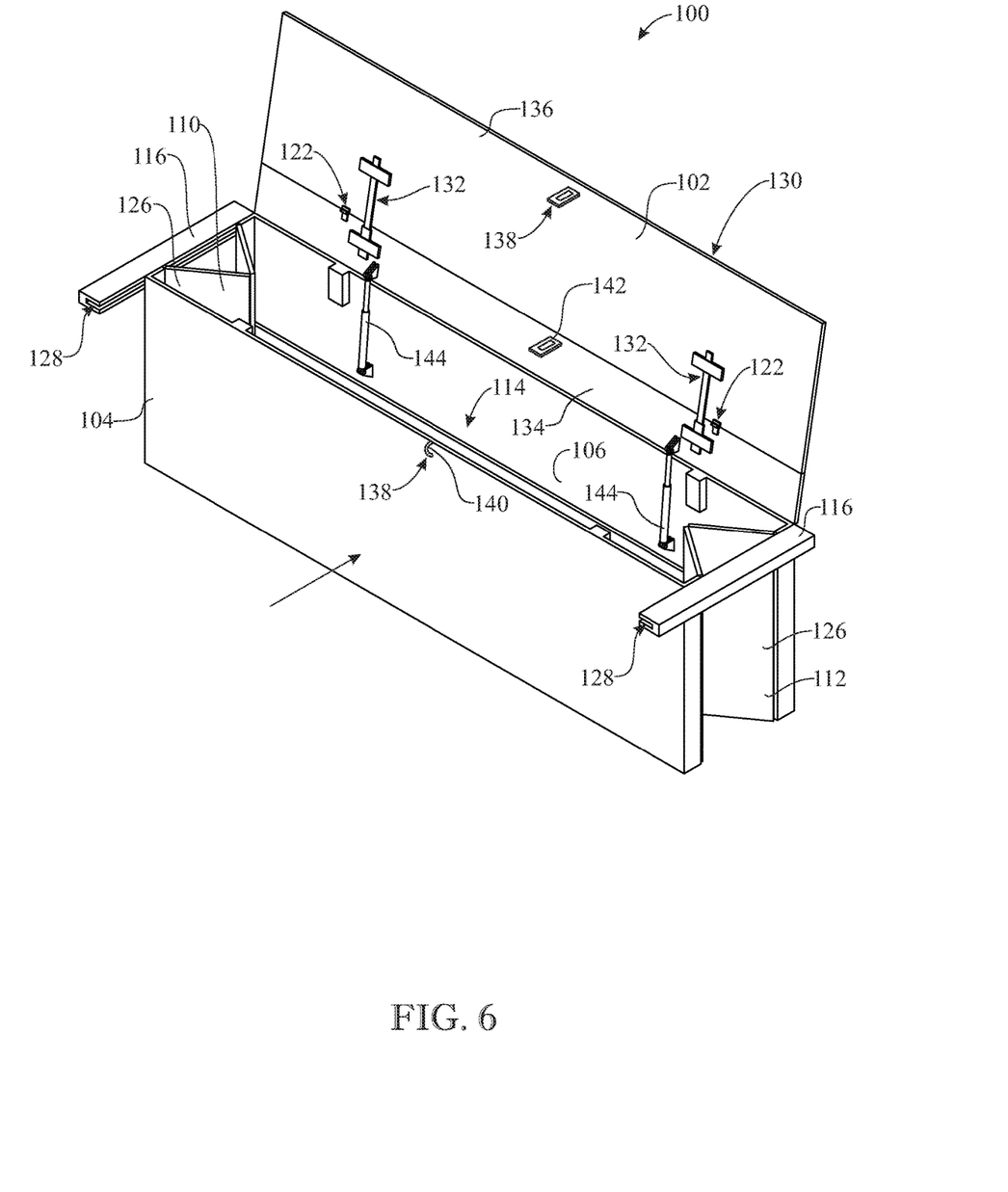
FIG. 6 presents an isometric front top view of a second exemplary collapsing step of the truck storage compartment, in accordance with aspects of the present disclosure.

The storage compartment 100 is configured to collapse via a collapsing mechanism. The illustrations of FIGS. 4-7 show a sequence of the storage compartment 100 collapsing from an uncollapsed configuration 118 of FIG. 4 to a collapsed configuration 120 of FIG. 7. For example, the bottom 108 collapses as shown in FIG. 5 by folding inward, towards the internal space 114, allowing the height of the storage compartment 100 to remain substantially unaltered and therefore greatly facilitating folding the storage compartment 100 without having to remove it from the pickup truck bed 200. Left side 110 and right side 112 collapse as shown in FIG. 6, folding inward towards the internal space 114, allowing the height of the storage compartment 100 to remain substantially unaltered. Collapsing the storage compartment 100 reduces or substantially eliminates the internal space 114 since the space between the front panel 104 and the back panel 106 reduces when the storage compartment 100 collapses.

Figure 2:
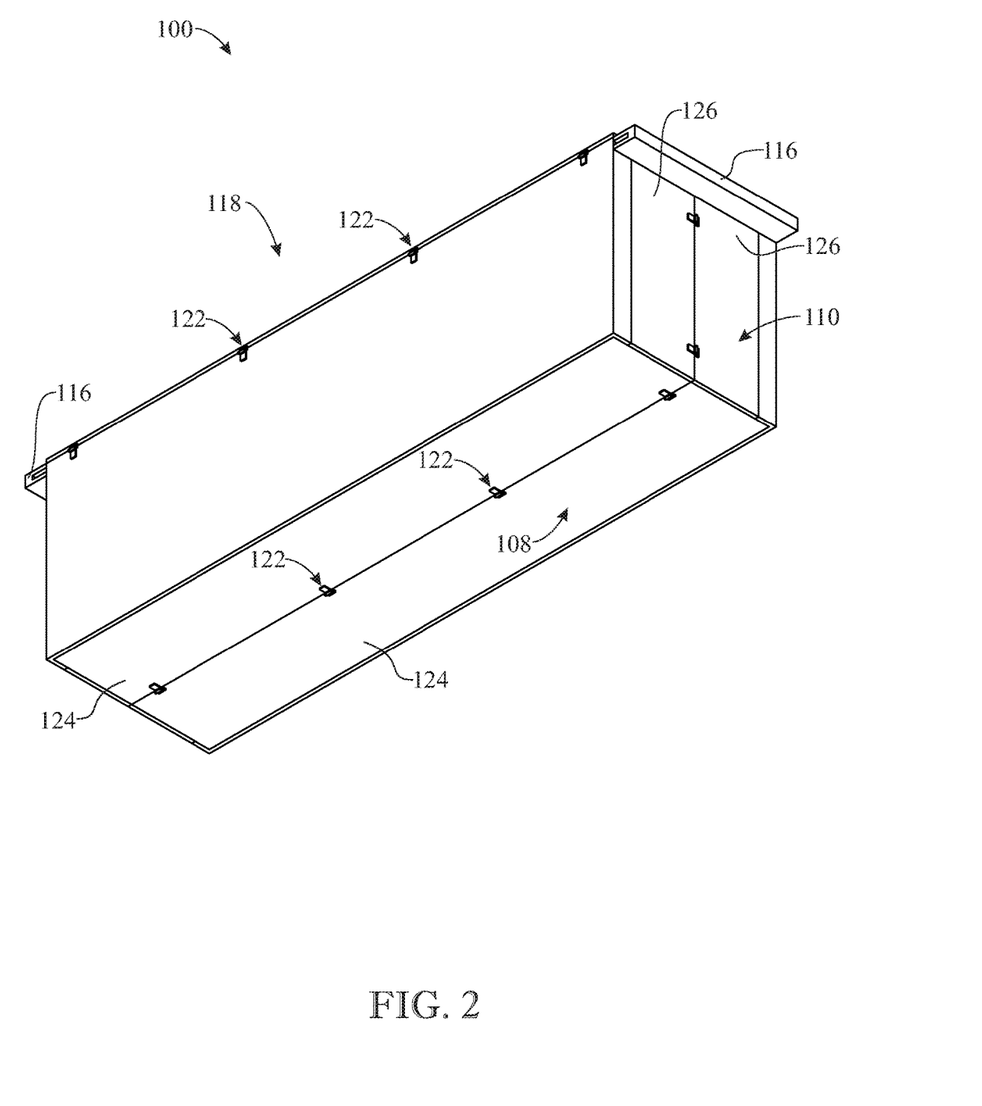
FIG. 2 presents an isometric back bottom view of the truck storage compartment in a covered configuration, in accordance with aspects of the present disclosure.
Figure 4:
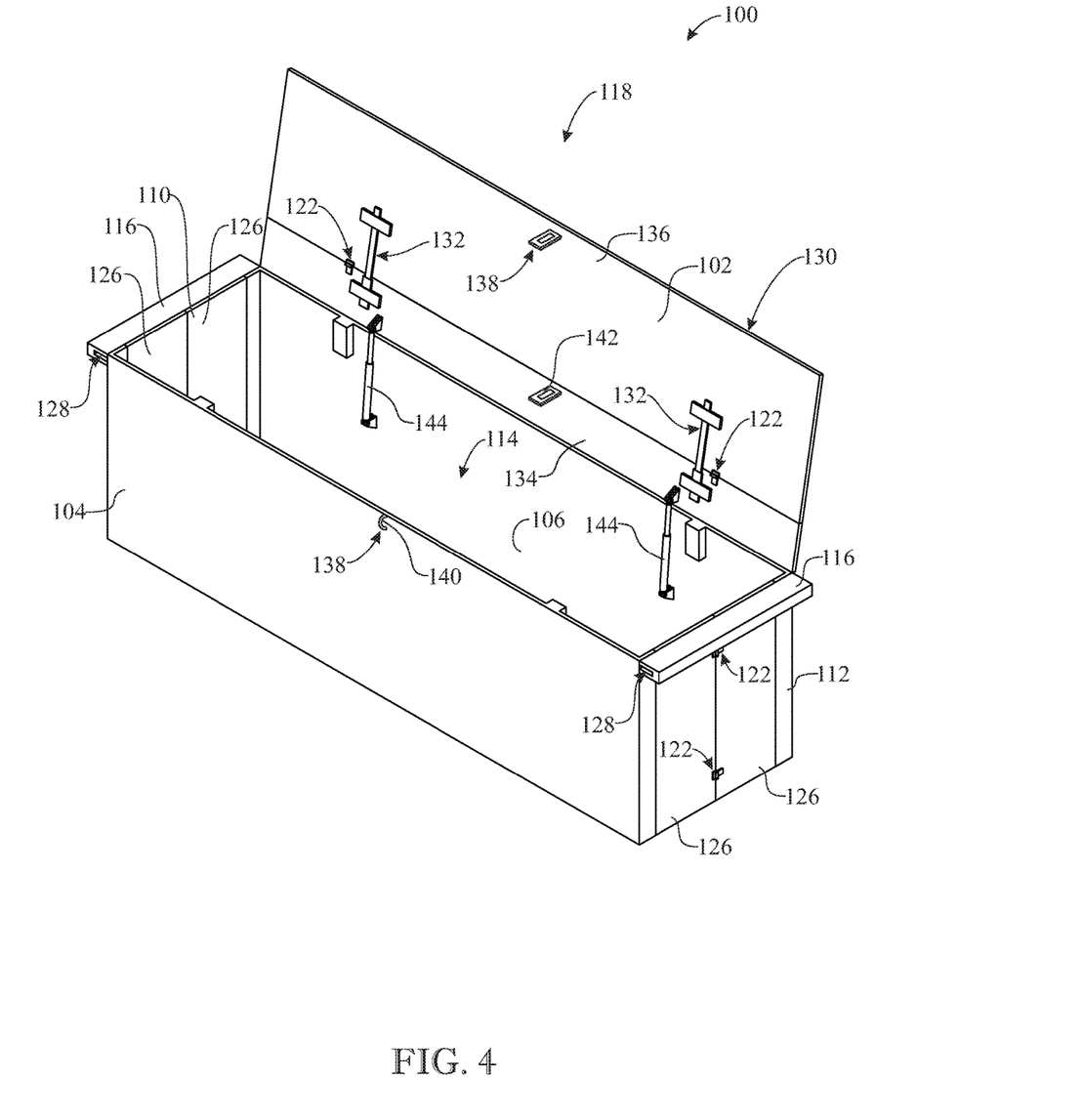
FIG. 4 presents an isometric front top view of the truck storage compartment in an uncovered configuration, in accordance with aspects of the present disclosure.

Configuring the bottom 108 and/or left side 110 and/or right side 112 to selectively collapse may be accomplished by including one or more hinges 122 on the storage compartment 100. The one or more hinges 122 may be referred to as a "collapsing mechanism", which may include alternative or additional components. For example, the one or more hinges 122 may be placed between two panels that form the bottom 108. Similarly, one or more hinges 122 may be placed between two panels that form left side 110 or between two panels that form right side 112. As such, the bottom 108 may include a plurality of bottom panels 124, as shown in FIG. 2, that are hingably attached to one another and to the storage compartment 100 such that the bottom 108 can selectively collapse while being retained to the storage compartment 100. Similarly, the left side 110 and the right side 112 may each include a plurality of side panels 126 that are hingably attached to one another and the storage compartment 100, as shown in FIG. 4, to allow the left side 110 and the right side 112 to selectively collapse while being retained to the storage compartment 100. The bottom 108, left side 110, and right side 112 may thus be configured to fold toward the back panel 106.

Portions of the left side 110 and right side 112 that are attached to the storage compartment 100 may be slidably attached to the storage compartment 100 via tracks 128. For example, FIG. 6 shows tracks 128 disposed on supports 116 such that when the left side 110 and right side 112 collapse, the left side 110 and right side 112 slide along tracks 128. The tracks 128 and/or the supports 116 may be mounted, located, or disposed on a truck bed. For example, the tracks may be an OEM element included in a utility track system provided with the truck bed (e.g. as provided by an original manufacturer). Alternatively, the track may be included in an aftermarket, mountable, utility track system. As such, the herein described tracks and the supports 116 may be invariably defined, and may either be an OEM element as part of the truck bed or an aftermarket mountable element to allow the storage compartment 100 to collapse. This feature provided by the tracks 128 allows the storage compartment 100 to collapse while maintaining a vertical orientation of the back panel 106 and the front panel 104, since the left side 110 and the right side 112 structurally support and are hingably attached to the front panel 104 and the back panel 106. As such, the tracks 128 allow smooth and convenient operation of collapsing and uncollapsing the storage compartment 100. As the front panel 104 is slidable relative to the back panel 106 along the tracks 128, the internal space (e.g., the volume of the internal space) of the storage compartment may be variably reduced or expanded as desired, where sliding motion of the front panel 104 may also cause folding of the left and right sides 110 and 112 via their inclusion of hinged panels. In other embodiments, the storage compartment 100 may be slidably engagable or attachable to an existing truck bed rail system. For example, the left side 110 and the right side 112 may include various pins or rail engagement members to slidably engage an existing truck bed rail system. In such embodiments, the supports 116 are not necessary and an existing truck bed rail system may be used as tracks to selectively collapse or uncollapse the storage compartment 100.

Figure 3:
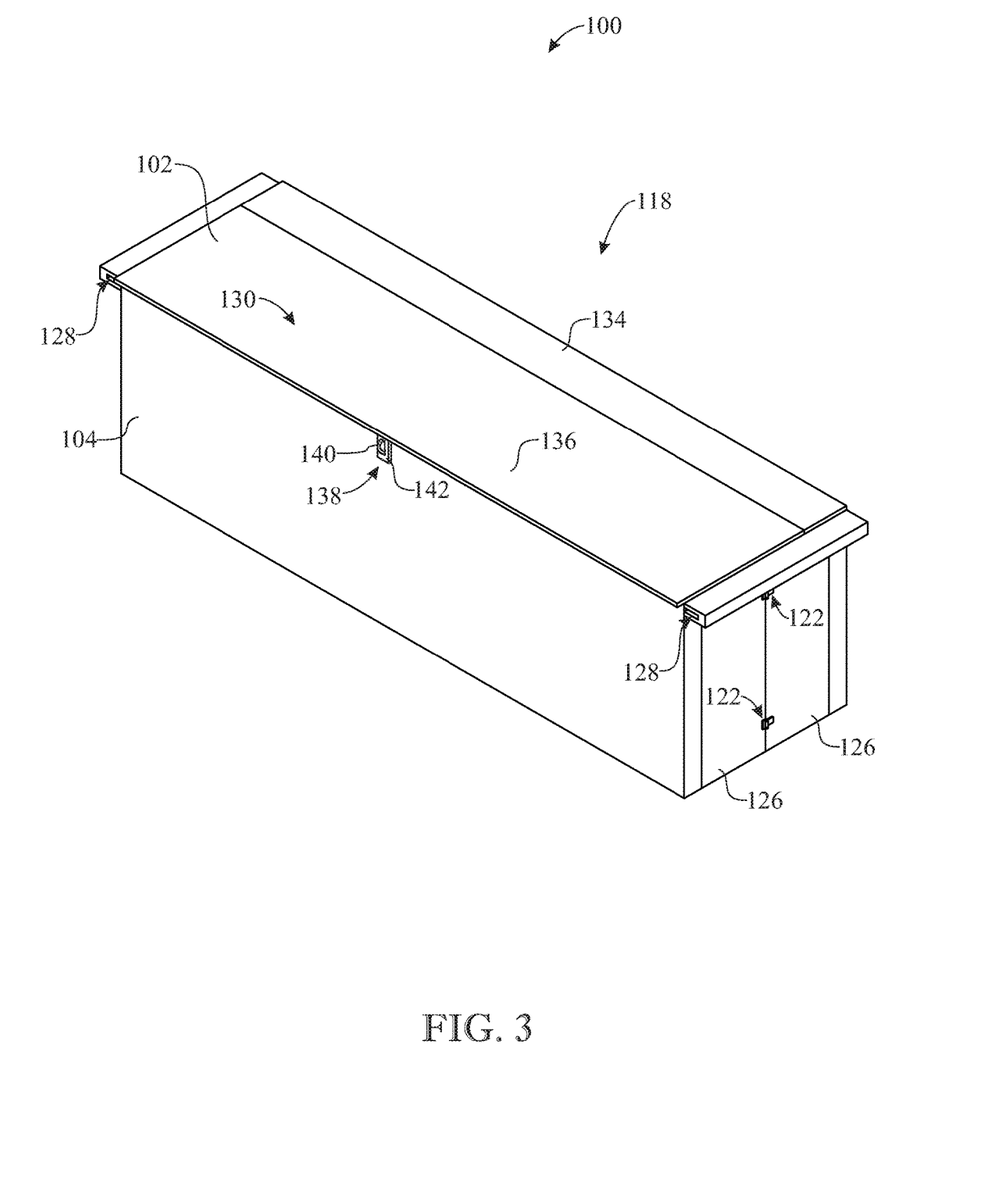
FIG. 3 presents an isometric front top view of the truck storage compartment in the covered configuration, in accordance with aspects of the present disclosure.
Figure 7:
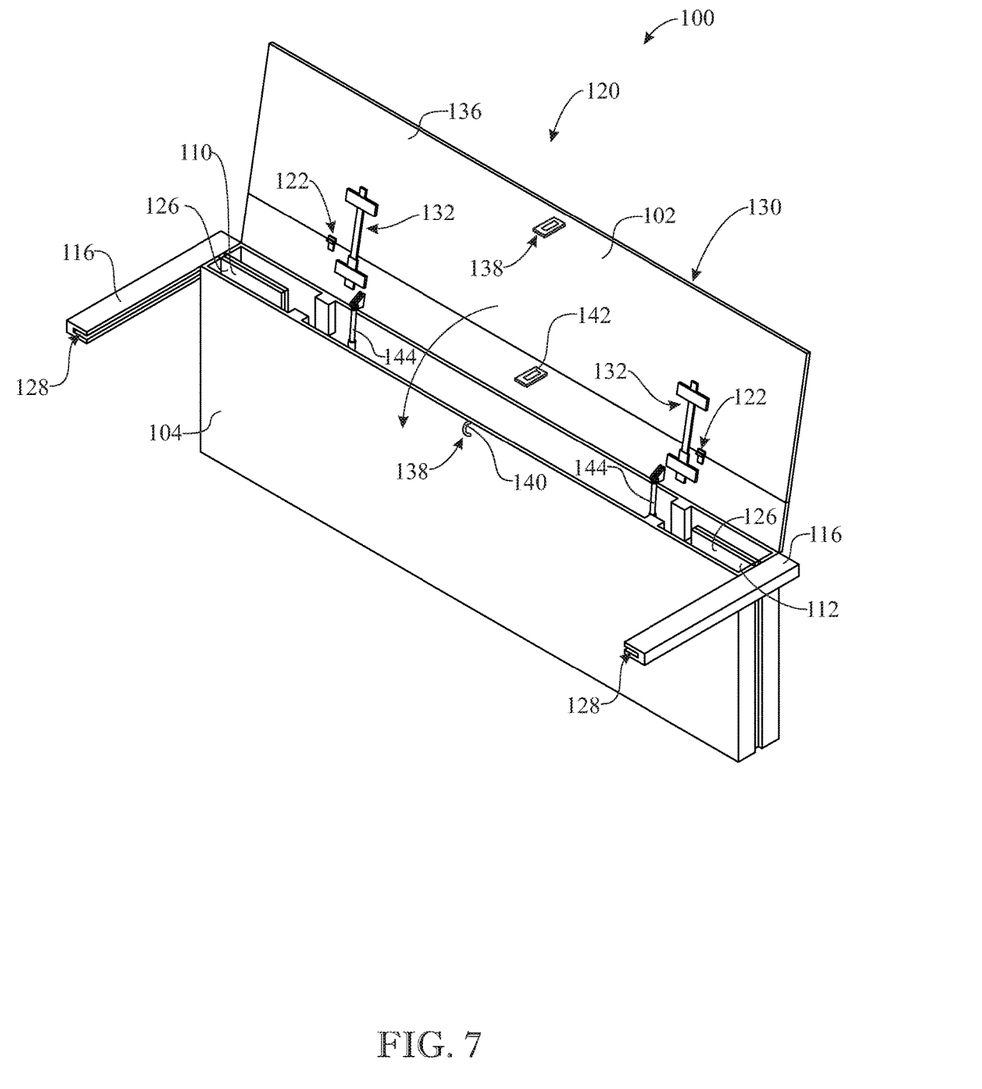
FIG. 7 presents an isometric front top view of the truck storage compartment, where a lid of the storage compartment is about to be folded, in accordance with aspects of the present disclosure.
Figure 8:
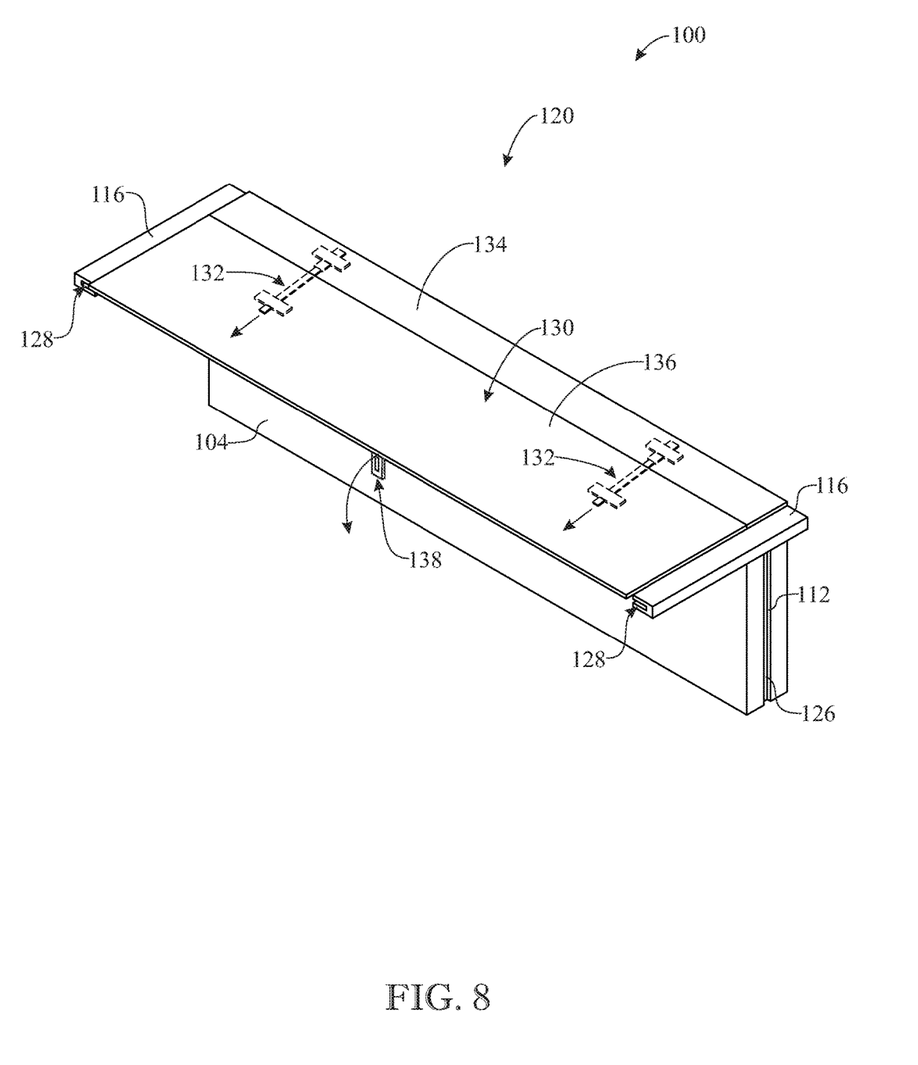
FIGS. 8-10 present three isometric front top views reflecting a folding sequence of the truck storage compartment, where the lid of the storage compartment is being gradually folded onto the collapsed bottom portion of the truck storage compartment, in accordance with aspects of the present disclosure.
Figure 9:
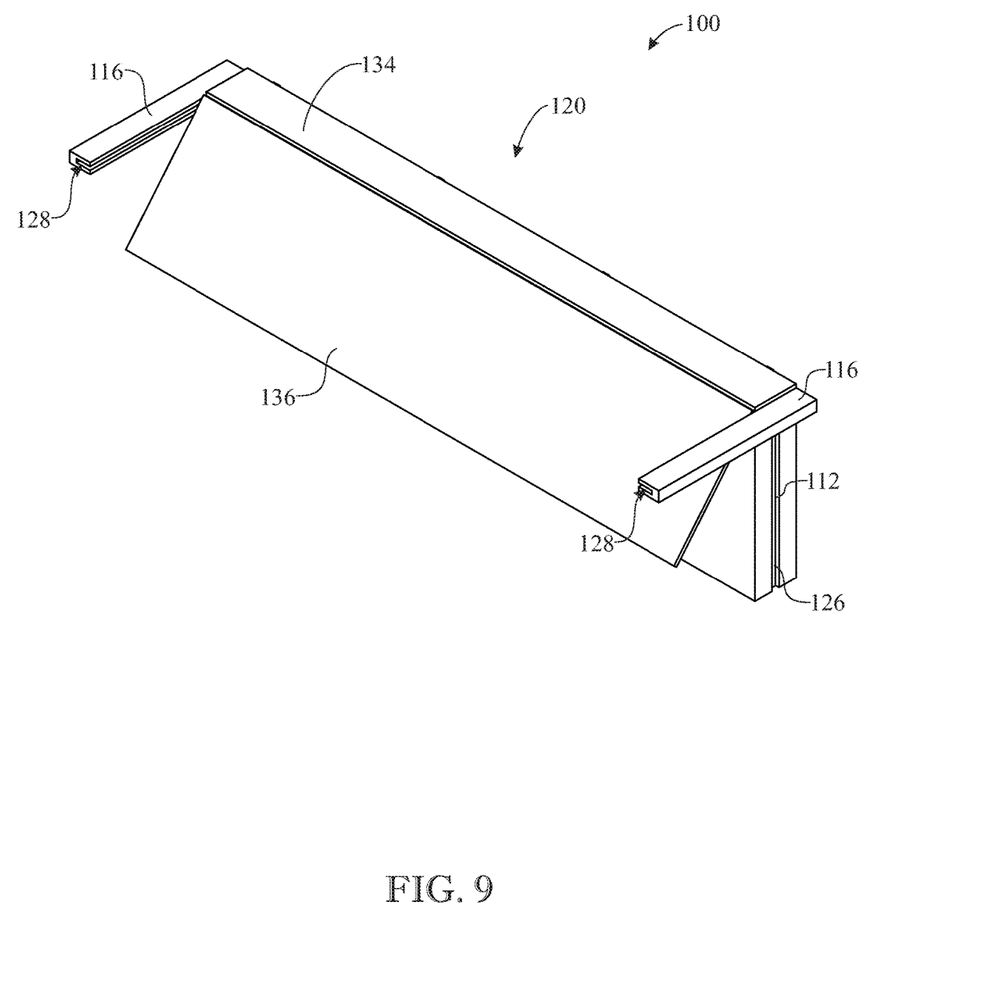
Figure 10:
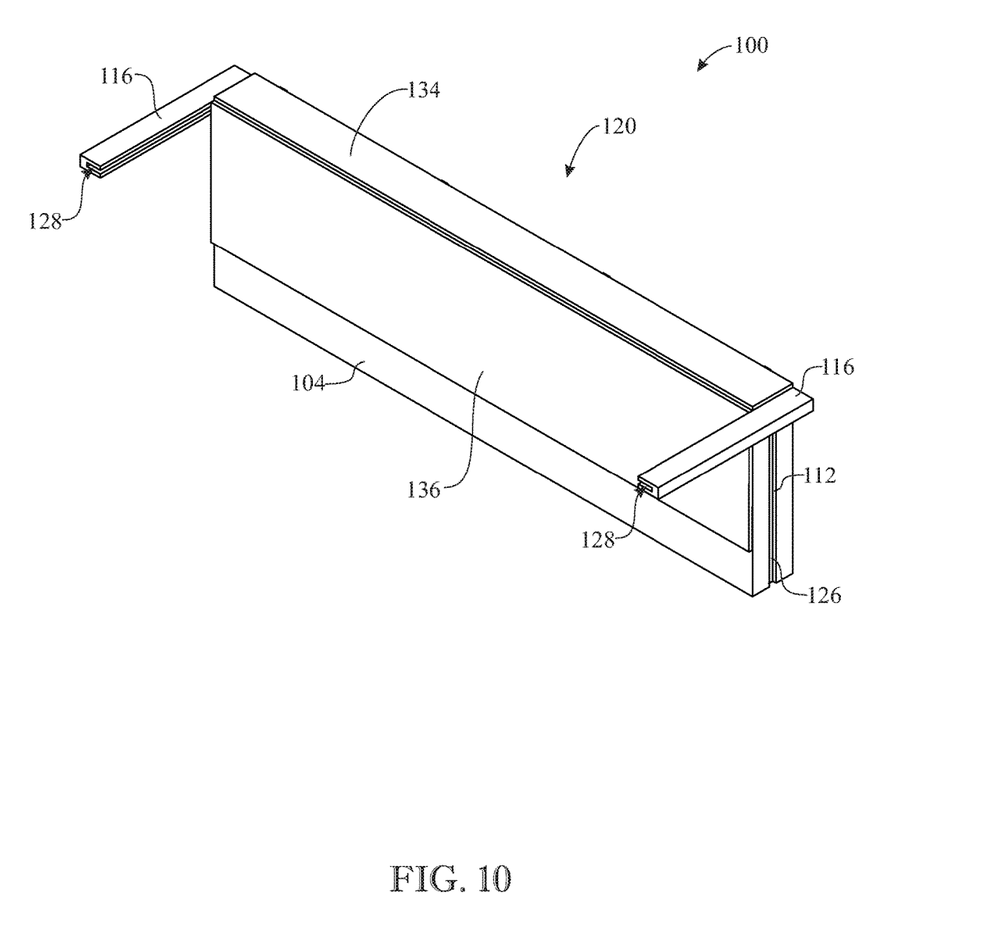

The lid 102 is configured to cover the internal space 114 when the storage compartment 100 is in either the collapsed configuration 120 or the uncollapsed configuration 118. For example, FIG. 3 shows the lid 102 covering the internal space 114 while the storage compartment 100 is in the uncollapsed configuration 118. On the other hand, FIG. 10 shows the lid 102 covering the internal space 114 while the storage compartment 100 is in the collapsed configuration 120. As such, the lid 102 may be hingably attached to the back panel 106 and/or left side 110 and/or right side 112 via the one or more hinges 122 to selectively cover the internal space 114. The lid 102 may be retained in a flat configuration 130 via removably attachable retainers 132 as shown in FIG. 8. When retained in the flat configuration 130, the lid 102 can selectively cover the internal space 114 when the storage compartment 100 is in the uncollapsed configuration 118 as shown in FIG. 3, where a first lid panel 134 and second lid panel 136 are parallel to one another and are substantially coplanar. Further, the lid 102 may be substantially perpendicular to the back panel 106 when retained in the flat configuration. The retainers 132 of the present embodiment are configured to lock the lid 102 in a position in which it is coplanar to the first lid panel 134 and resting in a horizontal position, thus providing a working surface, regardless of whether the left and right sides 110 and 112 are collapsed as shown in FIG. 8 or extended as shown in FIG. 3. When the retainers 132 are removed, the lid 102 can selectively fold downward and over the front panel 104 as shown in the sequence of FIGS. 7, 8 and 9. In FIG. 8, the panels 134 and 136 are parallel and covering the internal space. In FIG. 9, the panels 134 and 136 are obliquely oriented relative to each other and partially covering the internal space. In FIG. 10, the first lid panel 134 and the second lid panel 136 are substantially perpendicular to eachother (and thus the lid panel 136 is retained in a substantially parallel orientation relative to the back panel 106) while covering the internal space 114 while the storage compartment 100 is in the collapsed configuration 120. In the collapsed configuration 120 shown in FIG. 9, the lid 102, the front panel 104, the bottom 108, the left side 110, and the right side 112 are substantially parallel to one another. Since all these panels are arranged parallel to one another, the volume occupied by the storage compartment 100 in the collapsed configuration 120 is minimized. Only the supports 116 remain in their original longitudinal configuration, however they do not interfere with the pickup truck bed storage space as they are resting on the side walls 202. The fact that the first lid panel 134 is very small in comparison to the second lid panel 136 not only minimizes the use of the pickup truck bed space but also helps the storage compartment 100 stay clean when in the folded configuration 120, as horizontal surfaces are minimal. Having the second lid panel 136 hinged from the first lid panel 134 and onto the front panel 104 in the collapsed configuration 120 is advantageous in that, by the action of gravity, the second lid panel 136 tends to stay folded onto the front panel 104 and therefore maintain the storage compartment 100 in the collapsed configuration 120, and allow the storage compartment 100 to provide volume that would otherwise be occupied by the storage compartment 100 being in the uncollapsed configuration 118.

The storage compartment 100 may include a locking mechanism 138 to lock the lid 102 covering the storage compartment 100 in either the uncollapsed configuration 118 or the collapsed configuration 120. For example, FIG. 3 shows a locking mechanism 138 lockably securing the lid 102 in the uncollapsed configuration 118. On the other hand, although not shown, the lid 102 is locked in the collapsed configuration 120 of the storage compartment 100 to cover the storage compartment 100 as shown in FIG. 10. The locking mechanism 138 may include one or more pins 140 disposed on front panel 104 and/or back panel 106 that engage one or more receiving buckles 142 disposed either on the first lid panel 134 and/or second lid panel 136 in either the uncollapsed configuration 118 or the collapsed configuration 120. It is to be understood that the locking mechanism 138 may be variably configured and include pins and/or buckles on any element of the disclosed storage compartment 100. For example, the pins and/or buckles may be included on one of the lid 102, or any appropriate panel. Any appropriate locking or securing mechanism may be used to lockably secure the storage compartment 100 in the uncollapsed or collapsed configuration, or lockably secure the lid 102 over the storage compartment 100 in either the uncollapsed or collapsed configuration.

As shown in FIG. 4, the storage compartment may include pneumatic and/or gas filled struts 144 that provide lift support to the lid 102 and provide smooth operation during selectively opening and closing the lid 102. The struts 144 may bias the lid 102 toward the open position shown in FIG. 7 and/or may partially oppose rotational motion of the lid 102 such that movement of the lid 102 is smooth yet not cumbersome. For example, such struts 144 may operate similarly to trunk struts commonly found in automobile trunks.

In conclusion, disclosed is a collapsible pickup truck storage compartment that can be selectively collapsed from an uncollapsed configuration to a collapsed configuration. The storage compartment includes a lid that can be selectively locked to cover the storage compartment when the storage compartment is either in the uncollapsed configuration or the collapsed configuration. When in the collapsed configuration, the panels structuring the storage compartment are vertically positioned and substantially parallel to one another, providing useful space otherwise taken when the storage compartment is in the uncollapsed configuration.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A collapsible pickup truck bed storage compartment selectively collapsible between a collapsed and an uncollapsed configuration, comprising: a collapsing mechanism to collapse the compartment; a lid configured to cover the compartment in the collapsed and uncollapsed configuration; and a locking mechanism to selectively lock the lid such that the lid is selectively fixed into a non-movable position in the collapsed and uncollapsed configuration; and further comprising a front panel and a back panel that define the internal space of the storage compartment, the front panel being slidable relative to the back panel to variably reduce or expand the internal space; wherein the collapsing mechanism includes one or more hinges; and further comprising a bottom configured to fold inward toward an internal space of the storage compartment, the bottom including bottom panels that are hingably attached to one another via the one or more hinges.

2. The collapsible pickup truck bed storage compartment of claim 1, further comprising a left side and a right side each configured to fold inward toward an internal space of the storage compartment and each including respective panels that are hingably attached to one another via the one or more hinges.

3. The collapsible pickup truck bed storage compartment of claim 2, wherein the left side and the right side are attached to the storage compartment via respective tracks, the left and right sides being slidable along the respective tracks to collapse the left and right sides.

4. The collapsible pickup truck bed storage compartment of claim 3, wherein the respective tracks are disposed on respective supports at opposite ends of the storage compartment.

5. The collapsible pickup truck bed storage compartment of claim 3, further comprising a front panel and a back panel that define the internal space of the storage compartment, the front panel being slidable relative to the back panel along the respective tracks to variably reduce or expand the internal space, wherein sliding motion of the front panel toward the back panel causes folding of the left and right sides.

6. The collapsible pickup truck bed storage compartment of claim 1, further comprising a back panel, wherein the lid is hingably attached to the back panel via the one or more hinges for selectively covering an internal space of the storage compartment.

7. The collapsible pickup truck bed storage compartment of claim 6, further comprising one or more retainers configured to retain the lid in a flat configuration substantially perpendicular to the back panel.

8. The collapsible pickup truck bed storage compartment of claim 7, wherein the lid includes a first panel and a second panel, and in the flat configuration the first panel and the second panel are substantially coplanar.

9. The collapsible pickup truck bed storage compartment of claim 6, further comprising a front panel, the lid being operable to fold downward and over the front panel.

10. The collapsible pickup truck bed storage compartment of claim 1, further comprising: a front panel; and a back panel, wherein the locking mechanism includes one or more pins disposed on the front panel that engage one or more receiving buckles disposed on the lid.

11. A collapsible pickup truck bed storage compartment selectively collapsible between a collapsed and an uncollapsed configuration, comprising: a collapsing mechanism to collapse the compartment; a lid configured to cover the compartment in the collapsed and uncollapsed configuration; and a locking mechanism to selectively lock the lid such that the lid is selectively fixed into a non-movable position in the collapsed and uncollapsed configuration; wherein the collapsing mechanism includes one or more hinges; further comprising a left side and a right side each configured to fold inward toward an internal space of the storage compartment and each including one or more respective panels that are hingably attached to one another via the one or more hinges; and wherein the left side and the right side are attached to the storage compartment via respective tracks, the left and right sides being slidable along the respective tracks to collapse the left and right sides.

12. A collapsible pickup truck bed storage compartment selectively collapsible between a collapsed and an uncollapsed configuration, comprising: a collapsing mechanism to collapse the compartment; a lid configured to cover the compartment in the collapsed and uncollapsed configuration; and a locking mechanism to selectively lock the lid such that the lid is selectively fixed into a non-movable position in the collapsed and uncollapsed configuration; and further comprising a front panel and a back panel that define the internal space of the storage compartment, the front panel being slidable relative to the back panel to variably reduce or expand the internal space; further comprising: a front panel; a bottom; a left side; and a right side, wherein, in the collapsed configuration, the lid, the front panel, the bottom, the left side, and the right side are substantially parallel to one another.

* * * * *